United States Patent [19]
Hironaka et al.

[11] Patent Number: 5,301,788
[45] Date of Patent: Apr. 12, 1994

[54] METHOD OF AND APPARATUS FOR TRANSFERRING AND POSITIONING PALLET

[75] Inventors: Masakazu Hironaka, Sakado; Hiroshi Isozaki, Iruma; Satoru Ichihashi, Sayama; Atsuhiro Sakai, Utsunomiya, all of Japan

[73] Assignee: Honda Giken Kogyo Kabushiki Kaisha, Tokyo, Japan

[21] Appl. No.: 964,038

[22] Filed: Oct. 21, 1992

[30] Foreign Application Priority Data

| Oct. 21, 1991 | [JP] | Japan | 3-300987 |
| Dec. 11, 1991 | [JP] | Japan | 3-350964 |
| Dec. 11, 1991 | [JP] | Japan | 3-350965 |
| Dec. 11, 1991 | [JP] | Japan | 3-350966 |

[51] Int. Cl.⁵ .......................................... B65G 37/00
[52] U.S. Cl. .......................... 198/346.1; 198/345.3; 198/465.1
[58] Field of Search .............. 198/346.1, 345.3, 465.1; 29/33 P, 563

[56] References Cited

U.S. PATENT DOCUMENTS

| 4,181,211 | 1/1980 | Nishimura et al. | 198/346.1 |
| 4,449,277 | 5/1984 | Hasegawa et al. | 198/346.1 X |
| 4,715,490 | 12/1987 | Date et al. | 198/346.1 |
| 4,718,810 | 1/1988 | Hoehn et al. | 198/346.1 X |
| 4,996,754 | 3/1991 | Kitamura | 198/346.1 X |
| 5,018,617 | 5/1991 | Miyata et al. | 198/346.1 |
| 5,054,175 | 10/1991 | Date | 198/346.1 X |
| 5,062,190 | 11/1991 | Kitamura | 198/346.1 X |

FOREIGN PATENT DOCUMENTS

| 61-168459 | 7/1986 | Japan |
| 63-28739 | 2/1988 | Japan |
| 63-28740 | 2/1988 | Japan |
| 63-171797 | 7/1988 | Japan |
| 2-42724 | 3/1990 | Japan |
| 3-19651 | 2/1991 | Japan |

*Primary Examiner*—Cheryl L. Gastineau
*Attorney, Agent, or Firm*—Burns, Doane, Swecker & Mathis

[57] ABSTRACT

A pallet with a workpiece mounted thereon is delivered on a pallet carriage, and transferred onto the table of a machine tool which has a different height from the pallet carriage. Lifting mechanisms on the pallet carriage are engaged by respective positioning members in front of the machine tool. The lifting mechanisms are actuated to lift the pallet carriage to position the pallet carriage for transfer of the pallet onto the machine tool table. The pallet is transferred from the pallet carriage onto the machine tool table, half of a predetermined stroke by a first transfer mechanism on the pallet carriage and the remaining half of the stroke by a second transfer mechanism on the machine tool table. The table has vertically movable support rollers for supporting the pallet when it is transferred onto and from the table. When the pallet P is positioned on the table, the vertically movable support rollers are retracted downwardly. When the pallet is transferred onto the machine tool table, clamp units on the machine tool table enter T-shaped slots defined in the lower surface of the pallet, and are actuated to clamp the pallet directly on the table. Since the workpiece on the pallet thus clamped is held in a low position on the machine tool table, the workpiece can be machined by a machining tool that can move freely in a wide space.

10 Claims, 20 Drawing Sheets

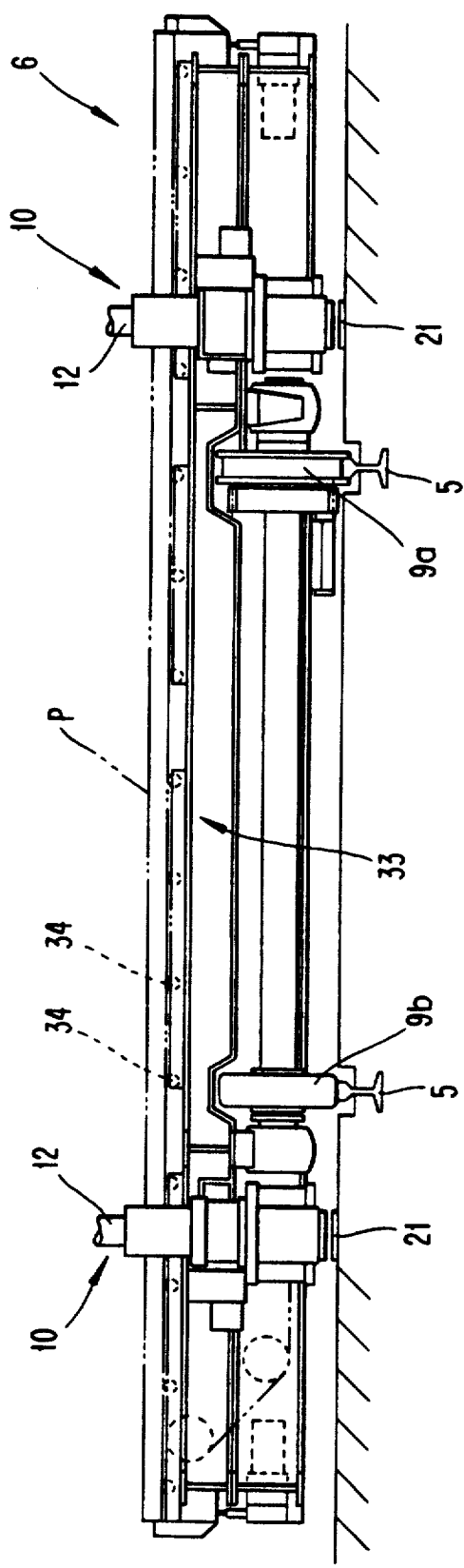
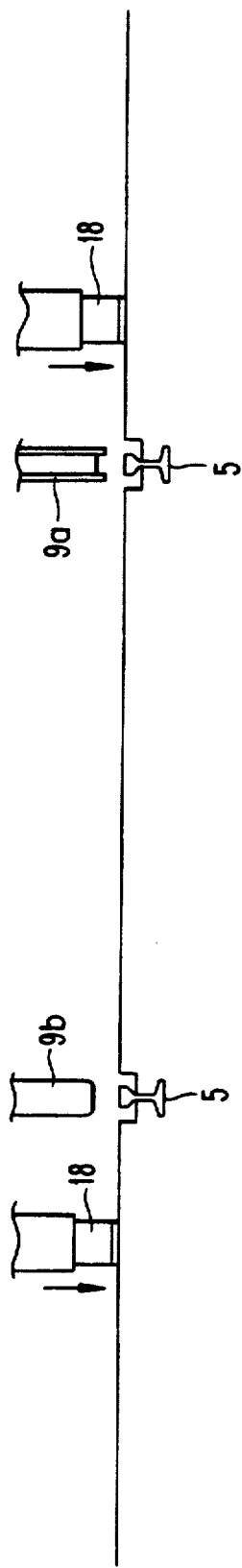
FIG. 9(A)
FIG. 9(B)

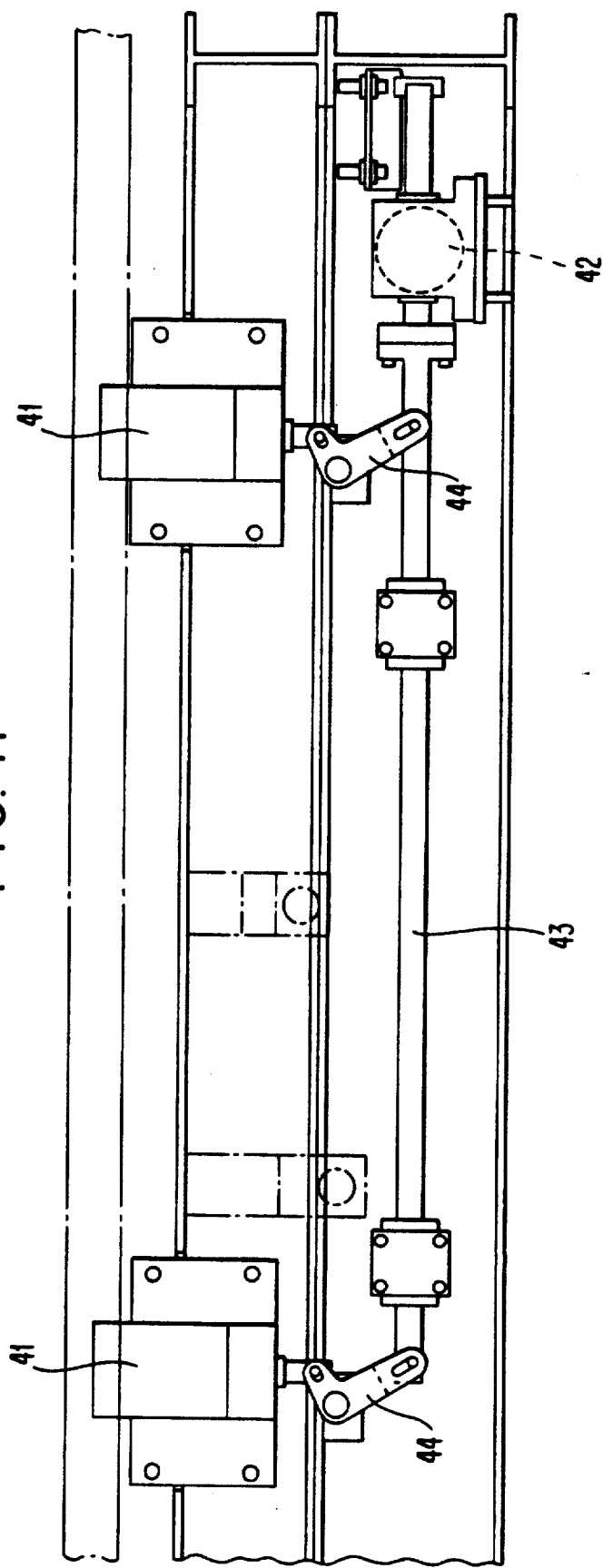

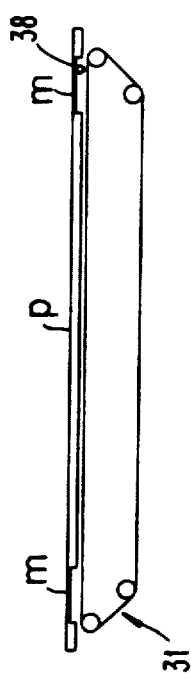
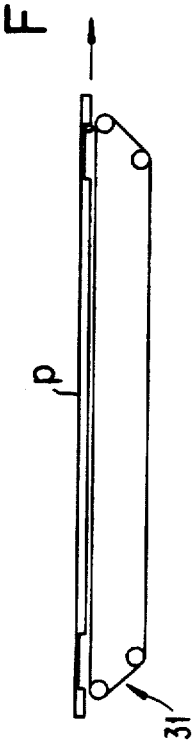
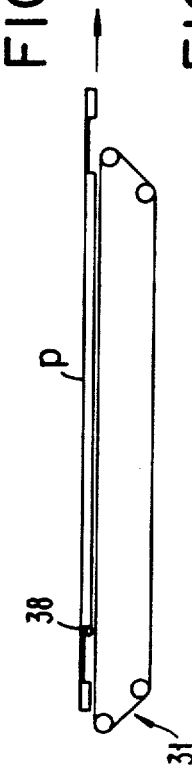
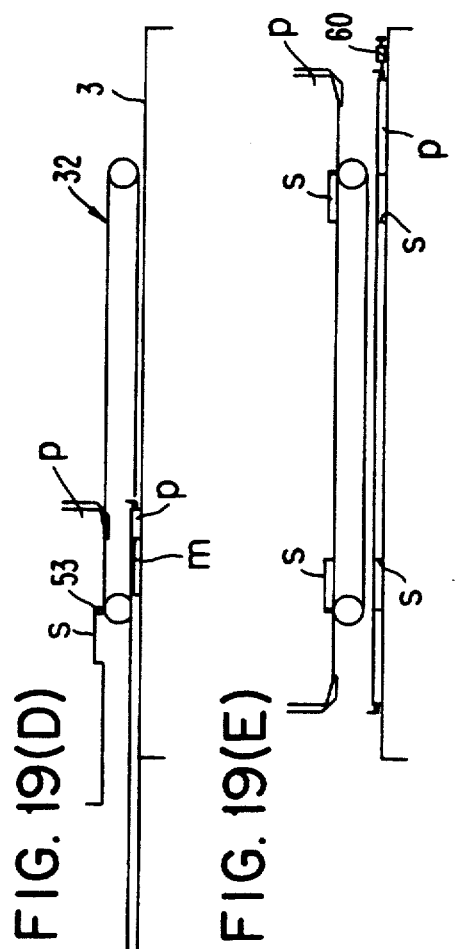
FIG. 19(A)
FIG. 19(B)
FIG. 19(C)
FIG. 19(D)
FIG. 19(E)

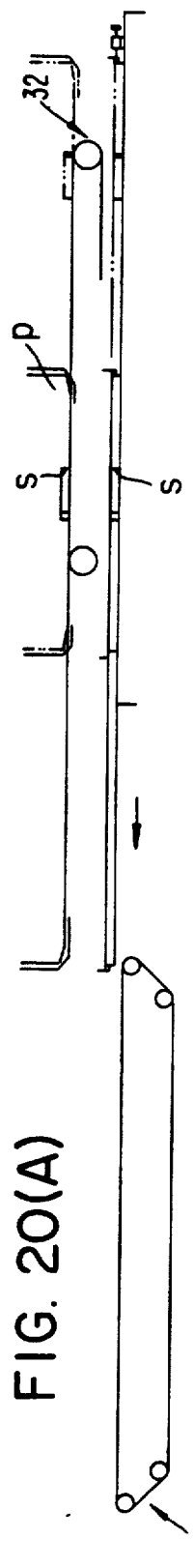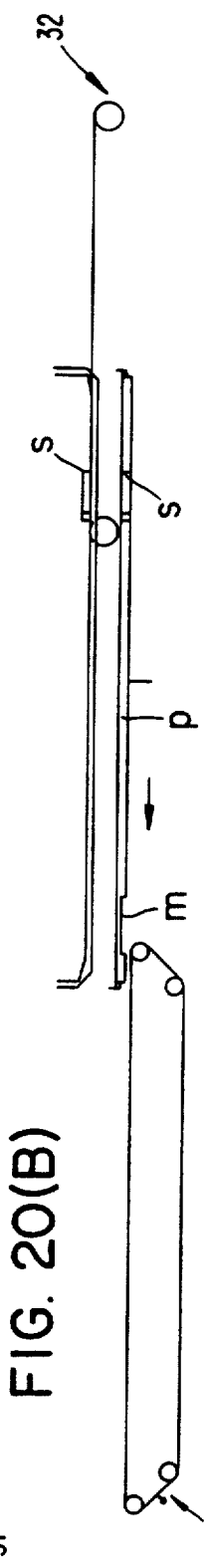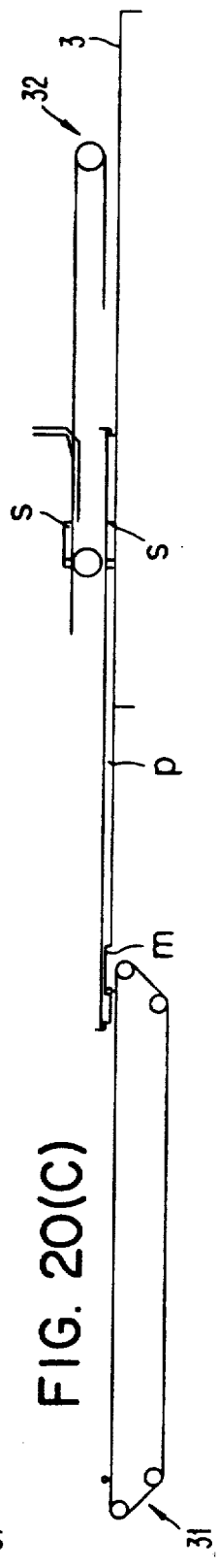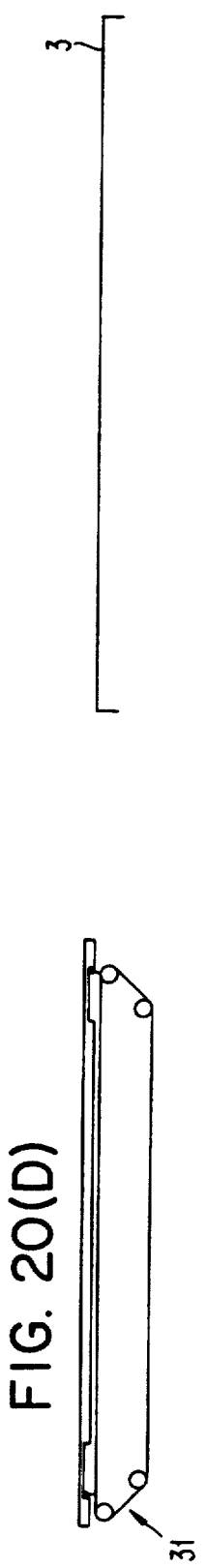

METHOD OF AND APPARATUS FOR TRANSFERRING AND POSITIONING PALLET

BACKGROUND OF THE INVENTION

1. Field of the Invention

The present invention relates to a method of and an apparatus for transferring a pallet, which has been supplied with a workpiece by a pallet stocker and delivered on a pallet carriage, onto the table of a machine tool and positioning the pallet on the table.

2. Description of the Relevant Art

For machining a workpiece such as a press die blank with a machine tool, it has been customary according to one practice to place and feed the workpiece on a pallet on a pallet carriage to a position near the machine tool, and then transfer the pallet from the pallet carriage to the table of the machine tool. For example, apparatus for loading and unloading workpieces between the pallet carriage and the machine tool, and positioning the workpieces on the table of the machine tool are disclosed in Japanese laid-open patent publication No. 61-168459, Japanese patent publications Nos. 63-28739 and 63-28740, Japanese laid-open utility model publications Nos. 2-42724 and 3-19651.

For smooth transfer of a pallet between a pallet carriage and the table of a machine tool, it is desirable that the height of the pallet carriage and the height of the machine tool table be the same as each other. Japanese laid-open patent publication No. 63-171797 discloses a self-propelled vehicle having a lifting mechanism. After the self-propelled vehicle loaded with a workpiece has been moved to a machine tool, the lifting mechanism is actuated to lift the workpiece up to the table of the machine tool, and then transfer the workpiece to the table.

Generally, machines tools are portal-shaped for machining workpieces from above. To machine workpieces having a certain height, such as press dies, it is necessary to lower the workpieces as much as possible on the machine tool to permit the cutter to move freely in a wide space for cutting the workpieces efficiently. Furthermore, the workpieces are required to be positioned accurately with respect to the machine tool table and fixed reliably to the machine tool table for increased machining accuracy.

There have also been demands for a compact mechanism for loading and unloading workpieces between the carriage and the machine tool, and hence for transfer apparatus which undergo less space limitations and are inexpensive to manufacture.

SUMMARY OF THE INVENTION

It is therefore an object of the present invention to provide a method of and an apparatus for transferring a workpiece pallet smoothly onto the table of a machine tool and positioning the workpiece pallet reliably in a low position on the table through an inexpensive mechanism.

According to the presetn invention, there is provided an apparatus for transferring and positioning a pallet for placing a workpiece thereon on a table of a machine tool, comprising a pallet carriage for carrying a pallet, the pallet carriage having a lifting mechanism for vertically moving the pallet carriage, and a first transfer mechanism for transferring the pallet substantially half of a predetermined stroke toward a machine tool, a machine tool table having a second transfer mechanism for transferring substantially the remaining half of the predetermined stroke, and a positioning clamp mechanism for positioning and clamping the pallet on the table directly in close contact therewith.

The pallet with the workpiece placed thereon is delivered on the pallet carriage to a position in front of the machine tool. Then, the pallet carriage is lifted by the lifting mechanism until the pallet is substantially aligned with the table in the vertical direction. The pallet is then transferred from the pallet carriage onto the table, half of the stroke by the first transfer mechanism and the remaining half of the stroke by the second transfer mechanism. Since the pallet is transferred jointly by both the first and second transfer mechanisms, the overall apparatus is prevented from being large in size. The transferred pallet is directly clamped on the table, so that the workpiece on the pallet is held in a low position and is positioned highly accurately in the vertical direction.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 9(A) is a front elevational view of a pallet carriage before it is lifted up;

FIG. 9(B) is a front elevational view of the pallet carriage after it is lifted up;

FIG. 11 is an enlarged fragmentary view of a pallet stopper as viewed in the direction indicated by the arrow XI in FIG. 3;

FIGS. 19(A) through 19(E) are views showing the manner in which the pallet is loaded from the pallet carriage onto the machine tool table; and FIGS. 20(A) through 20(E) are views showing the manner in which the pallet is unloaded from the machine tool table onto the pallet carriage.

DETAILED DESCRIPTION OF THE PREFERRED EMBODIMENT

Figure 1:
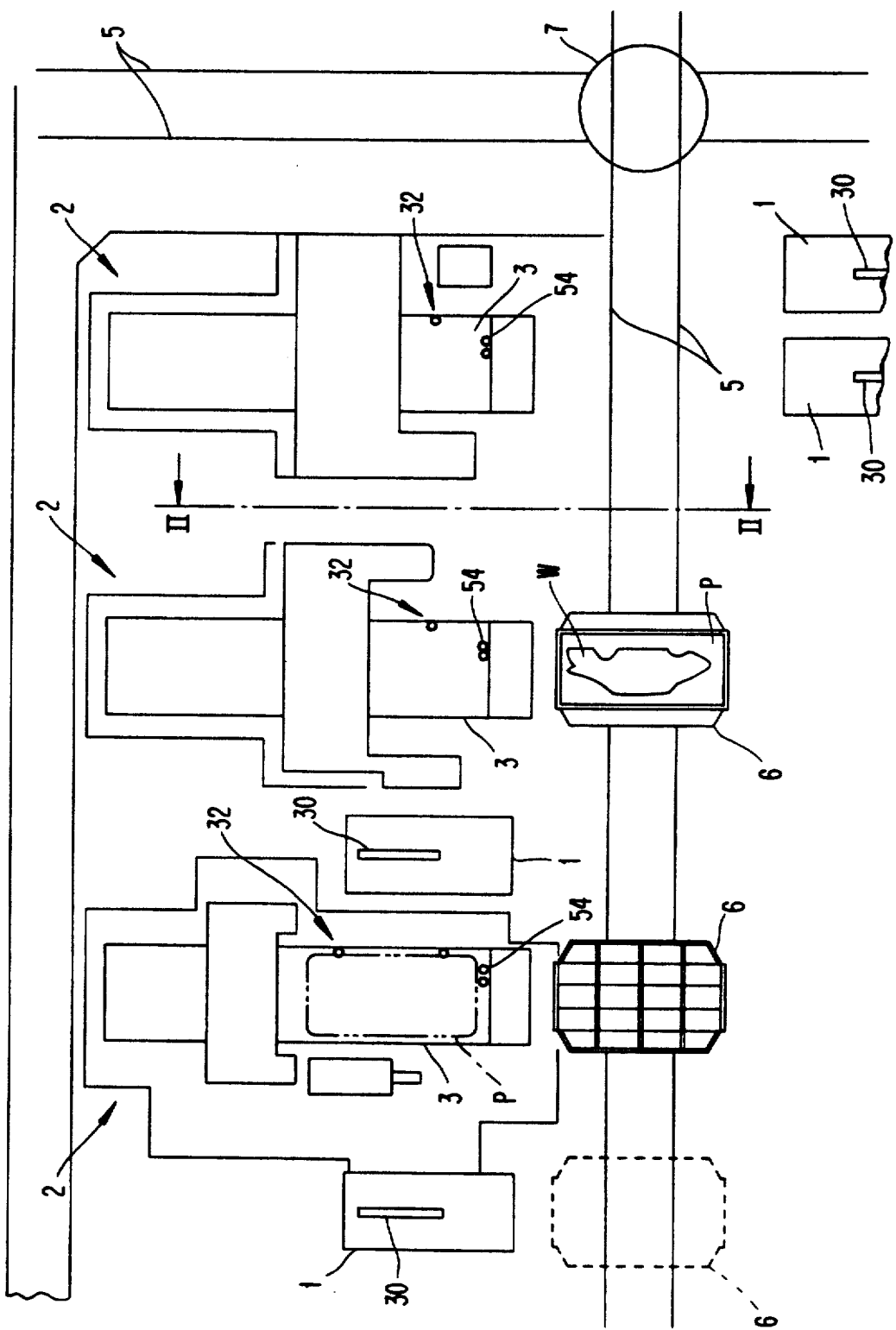
FIG. 1 is a plan view of an apparatus for transferring and positioning a workpiece pallet according to the present invention.
Figure 2:
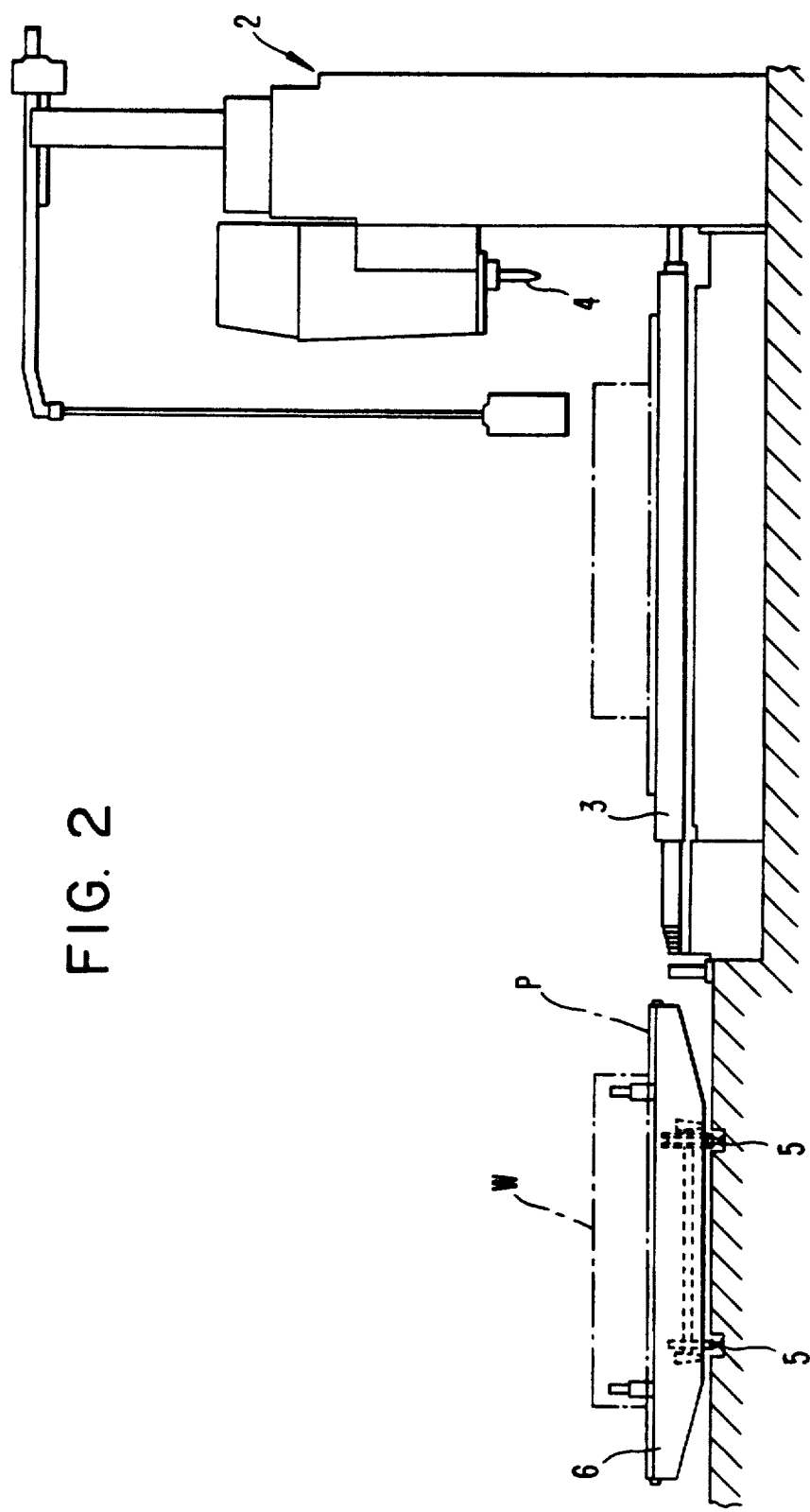
FIG. 2 is a side elevational view of a machine tool taken along line II—II of FIG. 1.

As shown in FIGS. 1 and 2, the principles of the present invention are particularly useful when embodied in an apparatus for transferring a workpiece W such as a press die blank or the like, which has been placed on a pallet P by a pallet stocker 1, onto a table 3 of a machine tool 2 and positioning the workpiece W on the table 3 for being machined by a cutting tool 4.

The apparatus generally comprises an array of pallet stockers 1 and an array of machines tools 2 which may be numerically controlled machine tools. Guide rails 5 extend along the pallet stockers 1 and the machine tools 2, and also between the machine tools 2 and other machine tools. Pallet carriages 6 are movably supported on the guide rails 5 for movement therealong.

The guide rails 5 include guide rails 5 positioned in front of the pallet stockers 1 and the machine tools 2, and other guide rails 5 connected to the above guide rails 5 through a turntable 7 and extending perpendicularly thereto. A workpiece W is placed on a pallet P on a pallet carriage 6 by a leftmost pallet stocker 1 in FIG. 1, and the pallet carriage 6 is moved to a position in front of one of the machine tools 2. The pallet P with the workpiece W supported thereon is then transferred onto and positioned on the table 3 of the machine tool 2, and then tool 4 of the machine tool 2. After being machined, the pallet P with the machined workpiece W is transferred back onto the pallet carriage 6, which is moved to the turntable 7. The turntable 7 is turned to change the direction of the pallet carriage 6 through 90°, for example, and the pallet carriage 6 is moved along the perpendicular guide rails 5 to another pallet stocker or machine tool.

Each of the pallet stockers 1 has a roller-chain transfer mechanism 30 for transferring a pallet P through half of a predetermined stroke between the pallet stocker 1 and a pallet carriage 6 that is positioned in front of the pallet stocker 1. Each of the pallet carriages 6 also has a roller-chain transfer mechanism 31 for transferring a pallet P through the other half of the stroke between the pallet carriage 6 and the pallet stocker 1. The transfer mechanism 30 is substantially the same as the transfer mechanism 31 which will be described in detail later on.

The table 3 of each of the machine tools 2 also has a transfer mechanism 32 for transferring a pallet P through half of a predetermined stroke between the machine tool 2 and the transfer mechanism 31. The transfer mechanism 32 will be described in detail later on.

The pallet stockers 1 are disposed alongside of some of the machine tools 2, and across the guide rails 5 5 from some of the machine tools 2.

Each of the pallet carriages 6 is in the form of a self-propelled vehicle which is electrically actuated by an electric motor that is supplied with electric energy from underground power lines. The pallet carriage 6 is substantially symmetrical in shape with respect to its longitudinal axis (which extends horizontally in FIG. 2) so that it can transfer a pallet P between itself and either one of pallet stockers 1 on the opposite sides of the guide rails 5. The pallet P is also substantially symmetrical in shape with respect to its longitudinal axis (which extends horizontally in FIG. 2).

The pallet carriage 6 will first be described in detail below.

Figure 3:
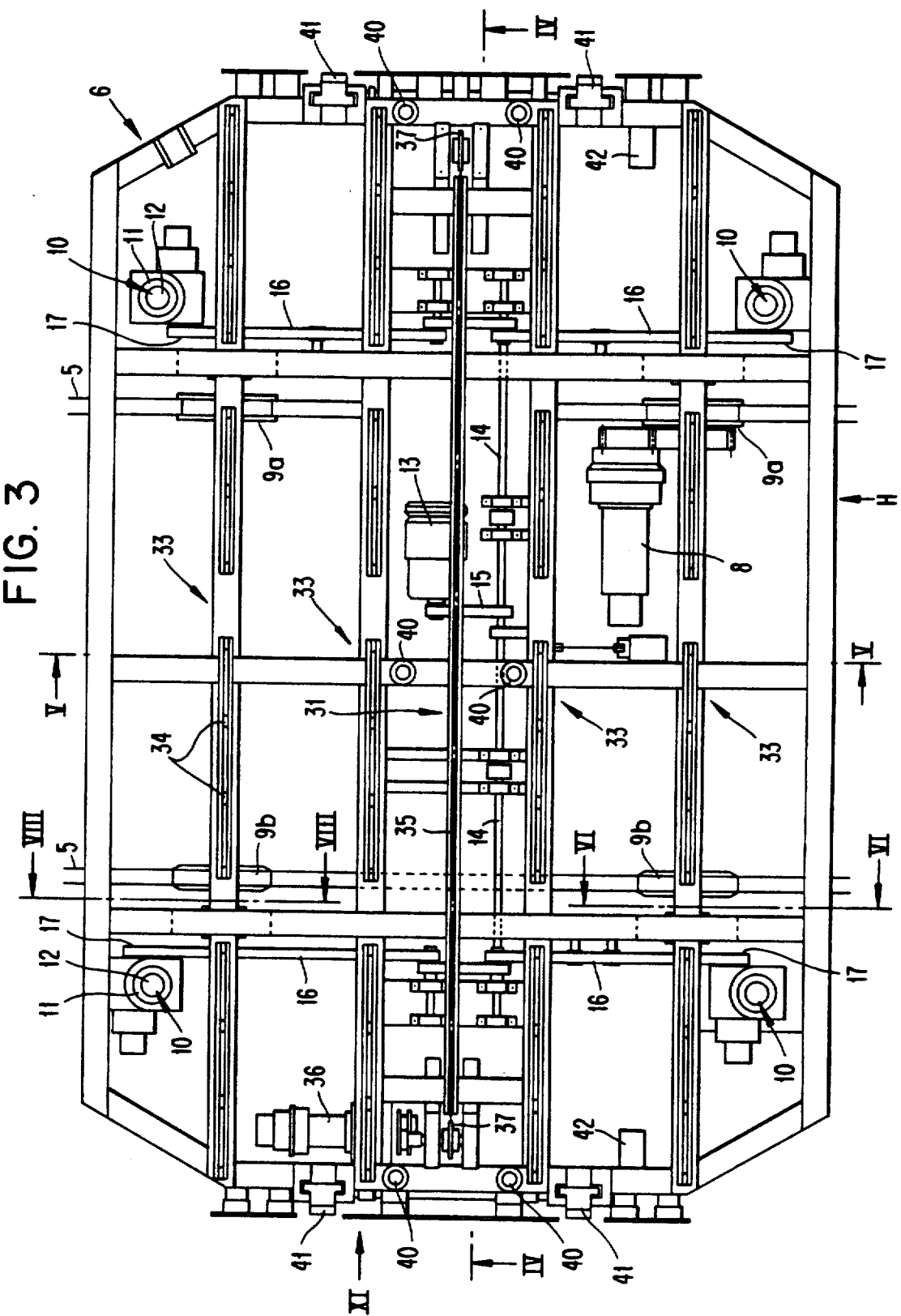
FIG. 3 is a plan view of a pallet carriage.

The pallet carriage 6 includes a frame of a substantially rectangular shape, as shown in FIG. 3. The pallet carriage 6 has an upper surface that is slightly lower than the upper surface of the table 3 of the machine tool 2 for transferring workpieces W to and from other processing stations.

In order to transfer the pallet P from the pallet carriage 6 onto the table 3, it is necessary to vertically align a number of transfer rollers (described later) on the upper surface of the pallet carriage 6 and a number of transfer rollers on the upper surface of the table 3. A carriage lifting and positioning mechanism (described later) is mounted on each pallet carriage 6 itself and the floor in front of each machine tool 2 for lifting the pallet carriage 6 up to a certain height to position the pallet carriage 6 with respect to the table 3.

As shown in FIG. 3, the self-propelled pallet carriage 6 has an electric motor 8 and two pairs of wheels 9a, 9b which are held in rolling engagement with the guide rails 5. One of the wheels 9a is operatively coupled to the motor 8 through meshing gears. The wheels 9a, which ride on one of the guide rails 5, have opposite side flanges engaging sides of the guide rail 5 to guide the wheels 9a along the guide rail 5. The other wheels 9b, which ride on the other guide rail 5, have no side flanges and can hence be positioned freely with respect to the guide rail 5. Therefore, the distance between the guide rails 5 may not be strictly accurate with respect to the wheels 9a, 9b.

The carriage lifting and positioning mechanism on the pallet carriage 6 includes four lifting mechanisms 10 on the respective corners of the frame, of the pallet carriage 6. The lifting mechanisms 10 serve to lift the pallet carriage 6 itself. Each of the lifting mechanisms 10 has a rotatable bearing 11 and a vertically movable lifter 12 in the form of a ball screw shaft threadedly supported in the bearing 11. The bearings 11 of the lifting mechanisms 6 are rotatable by the drive force transmitted from a motor 13 mounted on the pallet carriage 6 for vertically moving the respective lifters 12 with respect to the frame of the pallet carriage 6.

More specifically, as shown in FIG. 3, a timing belt 15 is trained around the output shaft of the motor 13 and a rotatable shaft 14 which is supported below and extends longitudinally along the carriage frame. The rotatable shaft 14 has opposite ends that are operatively coupled to belts 16 which are operatively coupled to worm gears 17 associated with the respective bearings 11. When the motor 13 is energized, its rotation is transmitted through the timing belt 15, the shaft 14, the belts 16, and the worm gears 17 to the bearings 11 for vertically moving the lifters 12 at a rate of about 6 mm per one revolution of the worm gears 17.

Figure 6:
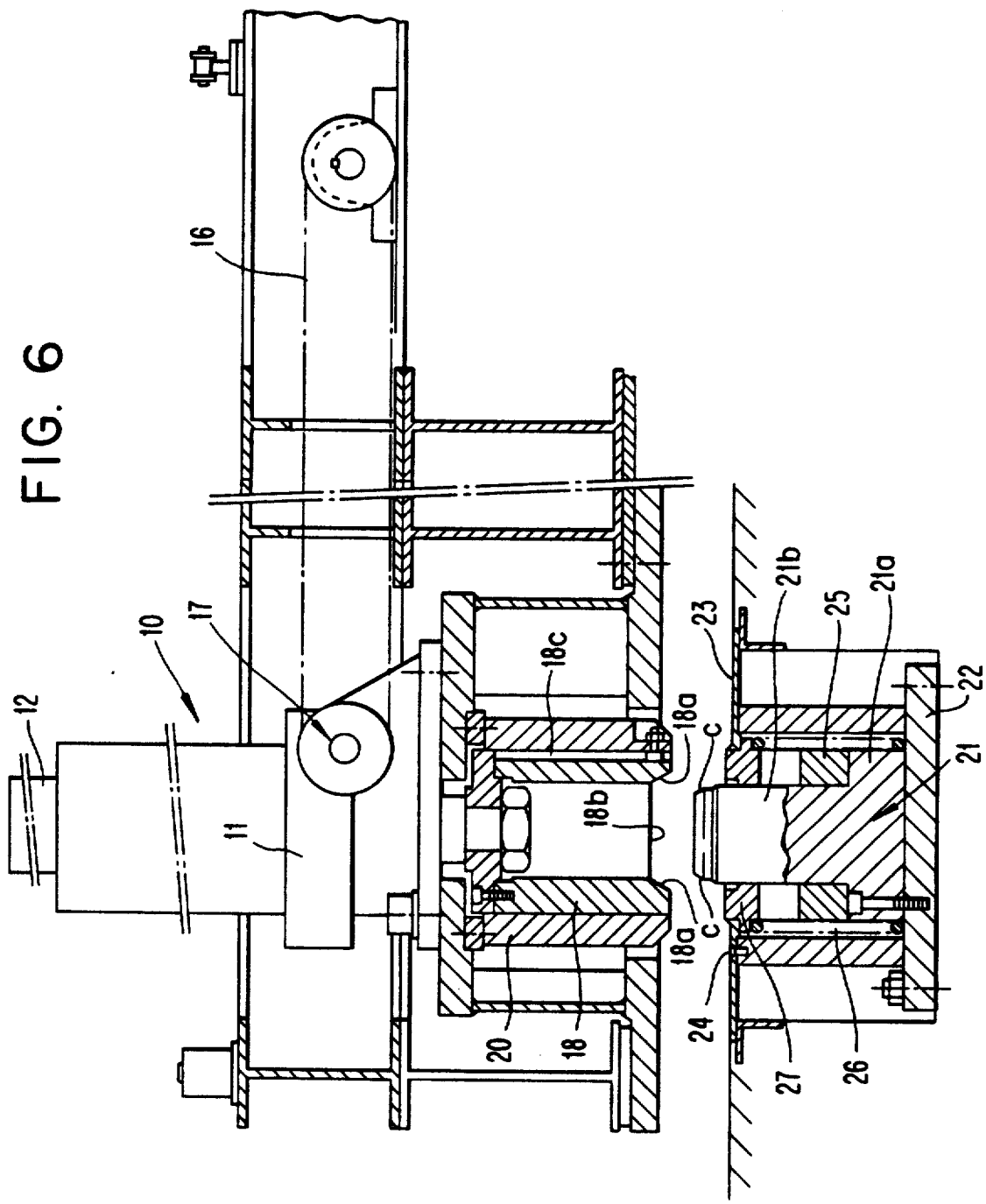
FIG. 6 is a cross-sectional view taken along line VI—VI of FIG. 3, showing a lifting mechanism.

As shown in FIG. 6, each of the lifting mechanisms 10 has a hollow cylindrical member 18 fastened to the lower end of the lifter 12. The cylindrical member 18 is housed in and held by a tubular guide member 20 attached to the carriage frame, and opens downwardly. One of the cylindrical members 18 on the four corners of the carriage frame, which is shown on the lower left corner in FIG. 3, has two confronting tapered surfaces 18a on its lower end which spread outwardly in the downward direction, as shown in FIG. 6.

The tapered surfaces 18a extend linearly parallel to the guide rails 5. The cylindrical member 18 also has opposite recesses 18b defined in its lower end and extending between the tapered surfaces 18a. The recesses 18b have bottom surfaces that are higher than the lower edges of the tapered surfaces 18a. As described later on, the tapered surfaces 18a serve to achieve smooth and reliable engagement with a lower positioning member 21 even if the pallet carriage 6 is roughly positioned.

The cylindrical member 18 shown in FIG. 6 has a single vertical groove 18c defined in an outer circumferential surface thereof. The tubular guide member 20 has a vertical ridge projecting radially inwardly from an inner circumferential surface thereof and engaging in the vertical groove 18c to prevent the cylindrical member 18 from rotating as it vertically moves, so that the tapered surfaces 18a are oriented constantly upon vertical movement of the cylindrical member 18.

The other three cylindrical members 18 have no tapered surfaces 18a, no recesses 18b, and no vertical groove 18c. However, the other structures of these cylindrical members 18 and the tubular guide members 20 associated therewith are identical to those of the cylindrical member 18 and the tubular guide member 20 shown in FIG. 6.

The positioning member 21 of the carriage lifting and positioning mechanism, on the floor in front of each of the machine tools 2, is disposed below each of the lifting mechanisms 10. The positioning member 21 disposed below the cylindrical member 18 with the tapered surfaces 18a is of a configuration different from the other three positioning members 21.

The positioning member 21 shown in FIG. 6 is fixedly mounted on a base 22 fastened in position in a cavity in the floor. The positioning member 21 has a support flange 21a on its bottom and a central pin 21b projecting upwardly from the center of the support flange 21a. The pin 21b is longer than the pins of the other three positioning members 21, and has opposite guide taper surfaces c on its upper end. The pin 21b shown in FIG. 6 has a diameter selected such that it can snugly fit into the cylindrical member 18.

Figure 7:
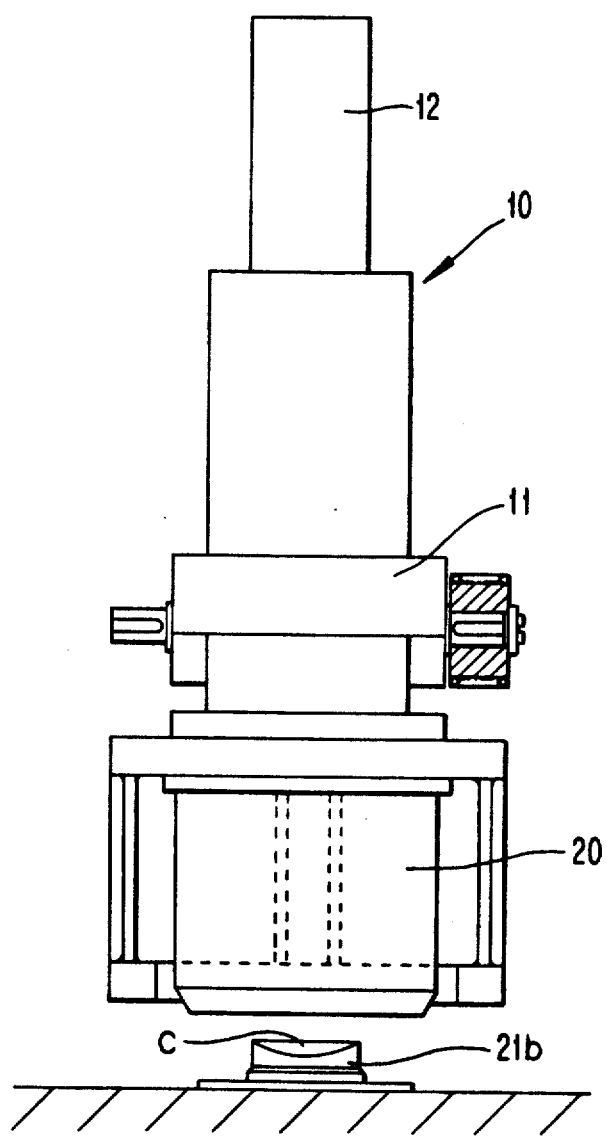
FIG. 7 is a front elevational view of the lifting mechanism shown in FIG. 6.

The guide taper surfaces c face upwardly outwardly so as to confront the respective tapered surfaces 18a of the cylindrical member 18. As shown in FIG. 7, the guide taper surfaces c are formed by linearly cutting off opposite edges of the pin 21b along the guide rails 5.

In FIG. 6, a cover 23 covering the cavity in the floor is fastened in position around the positioning member 21. The cover 23 has a circular hole defined therein which has a diameter slightly larger than the outside diameter of the cylindrical member 18. An annular position adjusting spacer 25 is fitted over the pin 21b and placed on the flange 21a.

A dust cap 27 which is urged upwardly by a spring 26 is disposed above the position adjusting spacer 25, and held in engagement with the inner circular edge of the cover 23. The dust cap 27 is axially slidable along the pin 21b under and against the bias of the spring 26. The dust cap 27 has an uppe rsurface higher than the upper surface of the cover 23 to prevent foreign matter such as chips from being deposited thereon. The dust cap 27 serves to prevent foreign matter such as chips from being trapped in the cavity in teh floor, and also to eliminate a vertical position error whcih would otehrwise occur due to deposited chips or other foreign matter.

There is a clearance created between the position adjusting spacer 25 and the dust cap 27, and the dust cap 27 is vertically movable in the clearance. As described later on, after the lower surface of the cylindrical member 18 engages and depresses the dust cap 27 until the dust cap 27 is brought into enggement with the position adjusting spacer 25, the dust cap 27 bears the weight of the pallet carriage 6. Therefore, the dust cap 27 is made of a strong material such as stainless steel for required mechanical strength.

Figure 8:
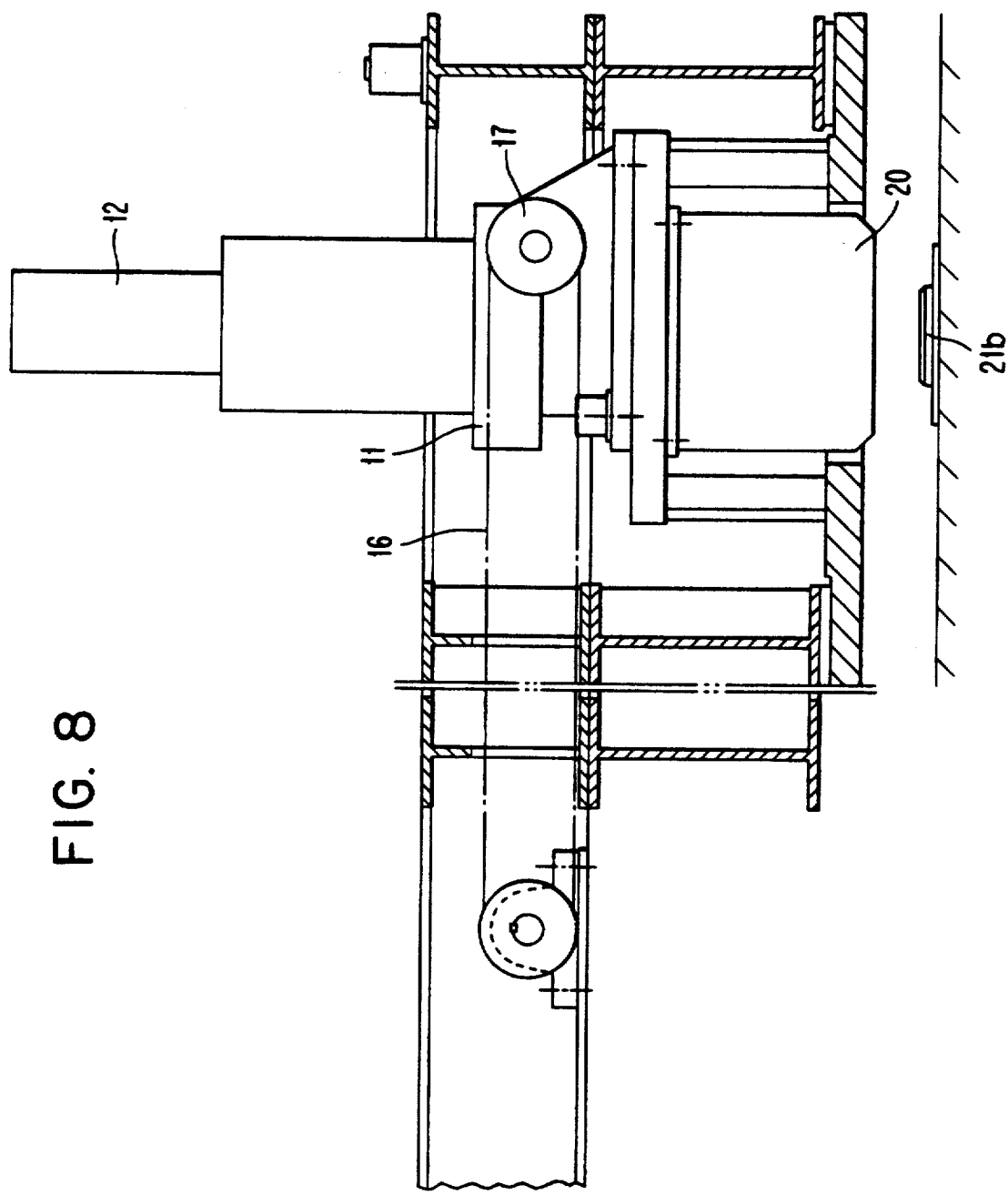
FIG. 8 is a cross-sectional view taken along line VIII—VIII of FIG. 3.

As shown in FIG. 8, each of the other three positioning members 21 has a pin 21b which projects less than the pin 21b shown in FIG. 6, and has no taper surface c. The other structural details, including the position adjusting spacer 25, the dust cap 27, and the cover 23, of the other three positioning members 21 are the same as those of those shown in FIG. 6.

The pallet P will be described in detail below.

Figure 12A:
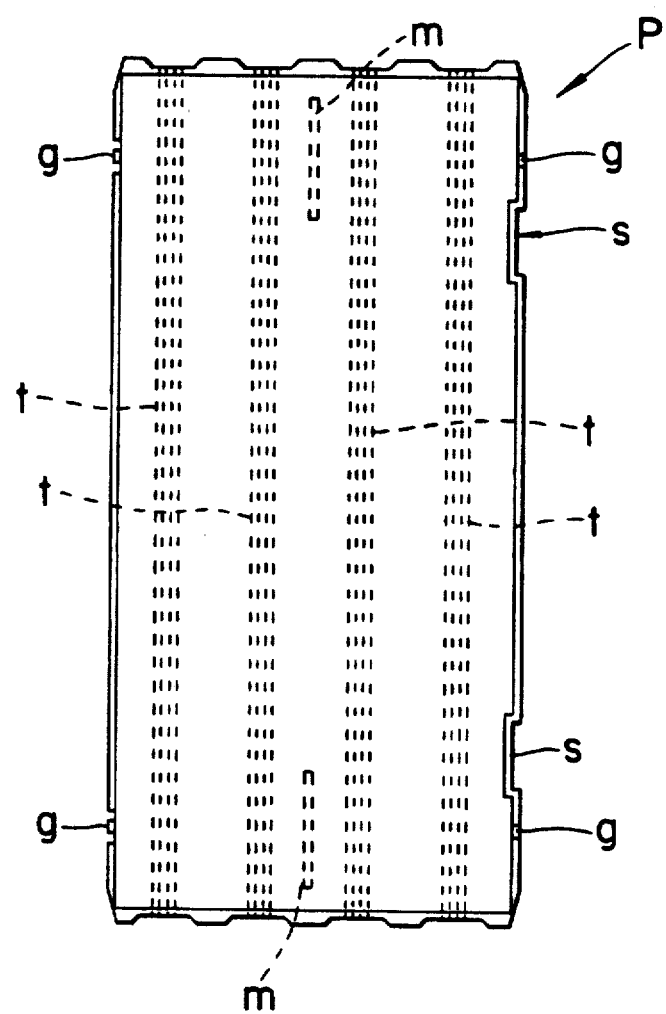
FIG. 12(A) is a plan view of a pallet.
Figure 12B:
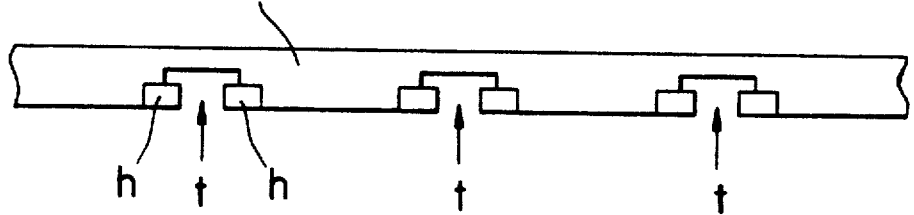
FIG. 12(B) is an enlarged fragmentary front elevational view of the pallet.

As shown in FIGS. 12(A) and 12(B), the pallet P is thinner than conventional pallets for supplying press die blanks. The pallet P is thin enough to allow its lower surface to be brought into intimate contact with the table 3 of the machien tool 2 when the pallet P supports a relatively heavy workpiece W such as a press die blank.

The pallet P is.a substantially rectangular in shape when viewed in plan, and has four parallel T-shaped slots t (see FIG. 12(B)) defined in the lower surface thereof and extending along the longitudinal direction of the pallet P. The T-shaped slots t receive guide rollers 40 (described later on) of the pallet carriage 6 and guide rollers 54 (described later on) of the machine tool 2 for smoothing the movement of the pallet P to and from the machine tool 2. The T-shaped slots t also serve to receive clamp units 55 (described later on) on the table 3 of the machine tool 2.

The pallet P also has a pair of front and rear grooves m defined in the lower surface thereof for engaging the transfer mechanism 30 on the pallet stocker 1 and the transfer mechanism 31 on the pallet carriage 6. Specifically, top rollers of the roller-chain transfer mechanism 30 and top rollers of the roller-chain transfer mechanism 31 engage in the grooves m in moving the pallet P to and from the machine tool 2.

The pallet P has a pair of front and rear side grooves s defined in a side edge thereof and extending longitudinally thereof for engagement with the transfer mechanism 32 on the machine tool 2. Specifically, the side grooves s receive rollers of the roller-chain transfer mechanism 32 while the pallet P is being loaded onto and unloaded from the table 3 of the machine tool 2.

Figure 5:
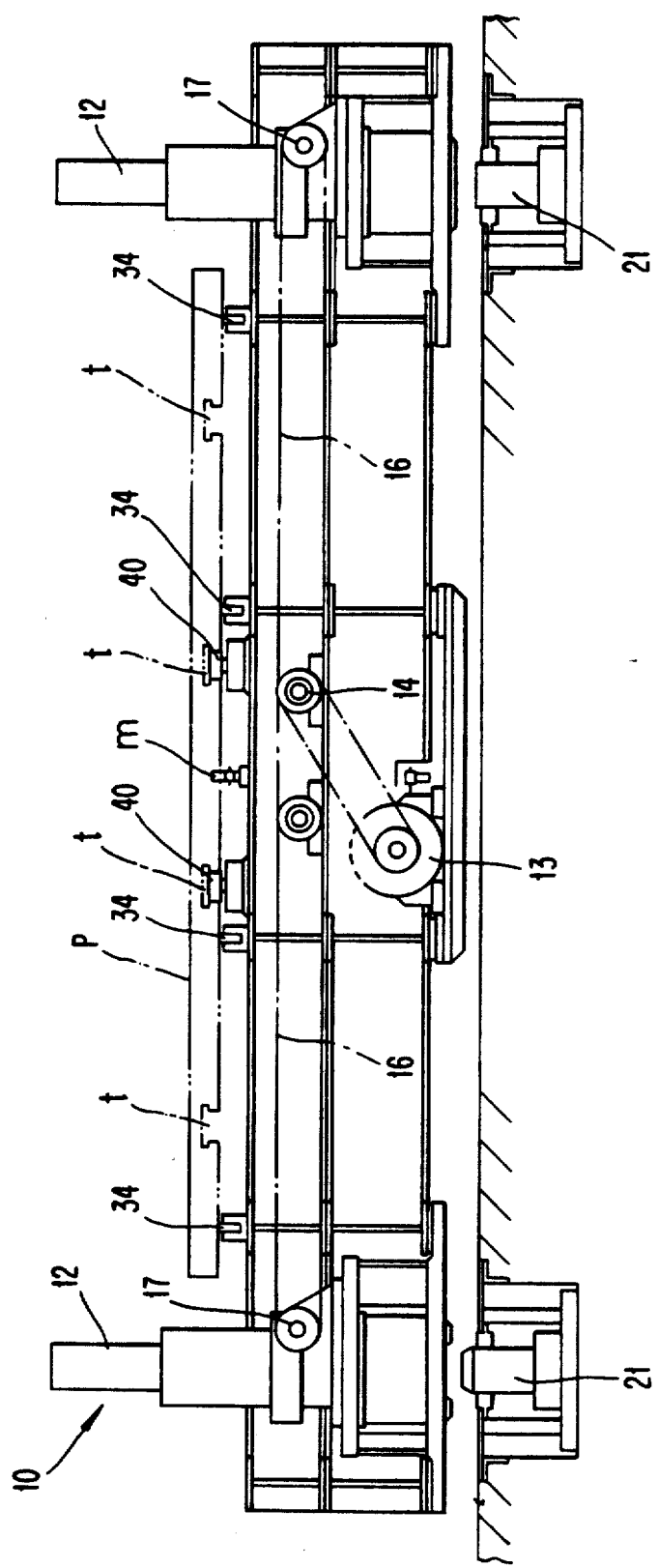
FIG. 5 is a cross-sectional view taken along line V—V of FIG. 3.

As shown in FIGS. 3 and 5, the pallet carriage 6 has four support roller rows 34. extending perpendicularly to the guide rails 5 and composed of a plurality of support rollers 34 projecting upwardly for supporting the pallet P thereon.

The transfer mechanism 31 on the pallet carriage 6 will be described below.

Figure 4:
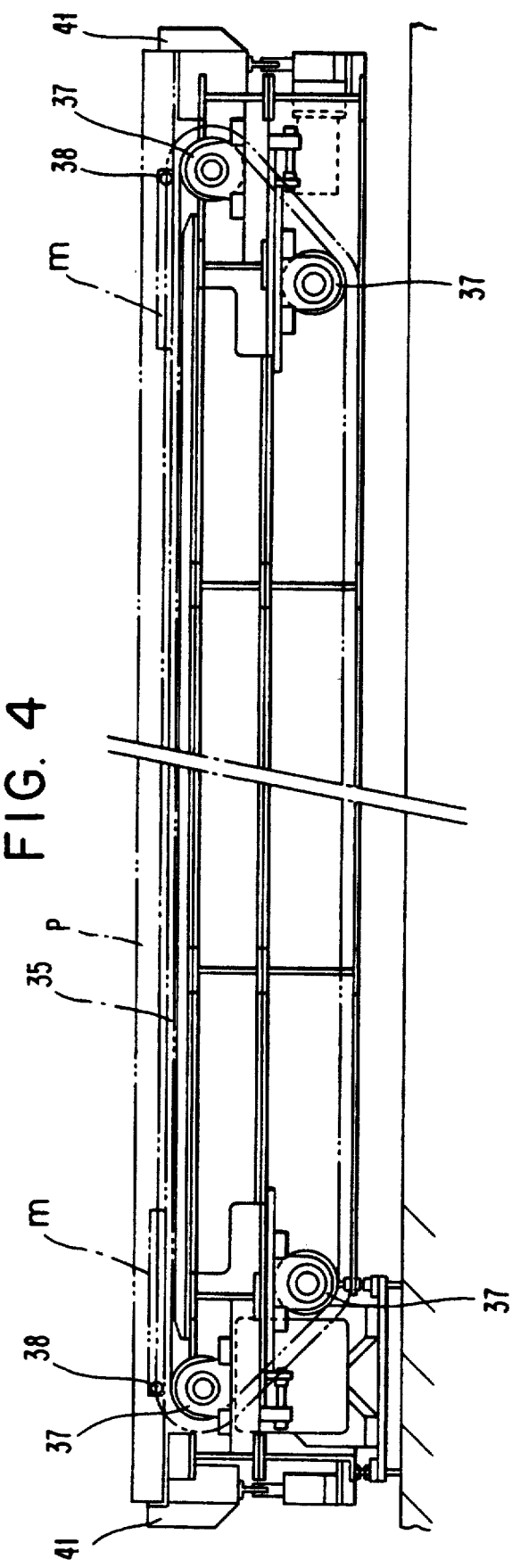
FIG. 4 is a cross-sectional view taken along line IV—IV of FIG. 3.

As shown in FIG. 3, the transfer mechanism 31 comprises a roller chain 35 extending centrally on the pallet carriage 6 along the direction in which the pallet P is loaded onto and unloaded from the table 3 of the machine tool 2, and an electric motor 36 for actuating the roller chain 35. As shown in FIG. 4, the roller chain 35 is of an endless configuration lying in a vertical plane and trained around a plurality of sprockets 37 rotatably supported on the carriage frame.

Figure 10:
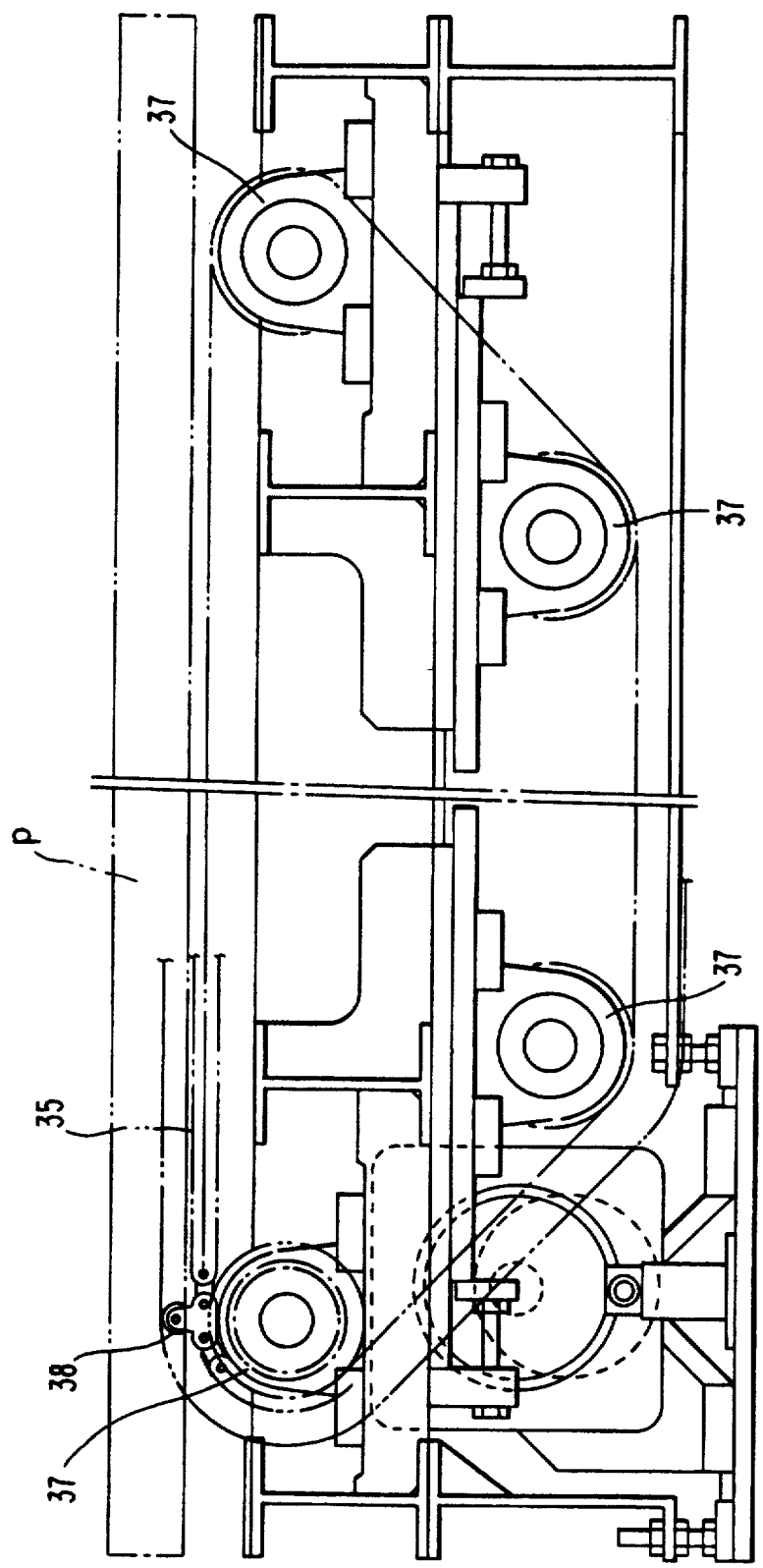
FIG. 10 an enlarged fragmentary view of a portion of the pallet carriage shown in FIG. 9(A)

The roller chain 35 has top rollers 38 (see FIG. 10 for detail) on the upper run thereof which can be received in the grooves m in the lower surface of the pallet P. When the roller chain 35 is driven clockwise (FIG. 4) by the motor 36, it moves the pallet P to the right for transfer onto the table 3 of the machine tool 2. When the roller chain 35 is driven counterclockwise (FIG. 4) by the motor 36, it moves the pallet P to the left for transfer onto the pallet carriage 6.

The pallet carriage 6 also has two rows of guide rollers 40 extending along the roller chain 35. The guide rollers 40 enter two central ones of the T-shaped slots t in the lower surface of the pallet P for preventing the pallet P from being wobbled laterally when the pallet P is transferred. The guide rollers 40 comprise horizontal rollers rotatable about respective vertical axes.

The pallet carriage 6 also has pallet stoppers 41 for positioning the pallet P that has been transferred onto the pallet carriage 6. The pallet stoppers 41 will be described below.

When the pallet P is transferred onto the pallet carriage 6, the pallet P is prevented from being positionally displaced laterally (vertically in FIG. 3) even if the pallet carriage 6 moves, because the guide rollers 40 engage in the grooves m. The pallet P is however more liable to be displaced in position in the longitudinal direction (horizontal direction in FIG. 3) of the pallet carriage 6 as the pallet P is supported on the rollers 34. The pallet stoppers 41 are effective to prevent the pallet P from being positionally displaced in the longitudinal direction of the pallet carriage 6.

More specifically, the pallet carriage 6 has stopper motors 42 on its opposite longitudinal ends, respectively, and two pallet stoppers 41 are positioned on each of the longitudinal ends of the pallet carriage 6 and associated with each of the stopper motors 42. When the pallet P is transferred onto the pallet carriage 6 from one end of the pallet carriage 6, those pallet stoppers 41 on that end are retracted downwardly out of interference with the pallet P. After the pallet P has been transferred to the pallet carriage 6, the retracted pallet stoppers 41 are raised into engagement with an end of the pallet P. Therefore, the opposite ends of the pallet P are engaged by the pallet stoppers 41 against movement in the longitudinal direction of the pallet carriage 6.

As shown in FIG. 11, the pallet stoppers 41 on each end of the pallet carriage 6 are operatively coupled through links 44 to a rack shaft 42 which is held in mesh with an output pinion of the motor 42. Therefore, when the motor 42 is energized, the rack shaft 42 is axially displaced, causing the links 44 to raise or lower the pallet stoppers 41.

The transfer mechanism 32 on the table 3 of the machine tool 2 will be described below.

Figure 13:
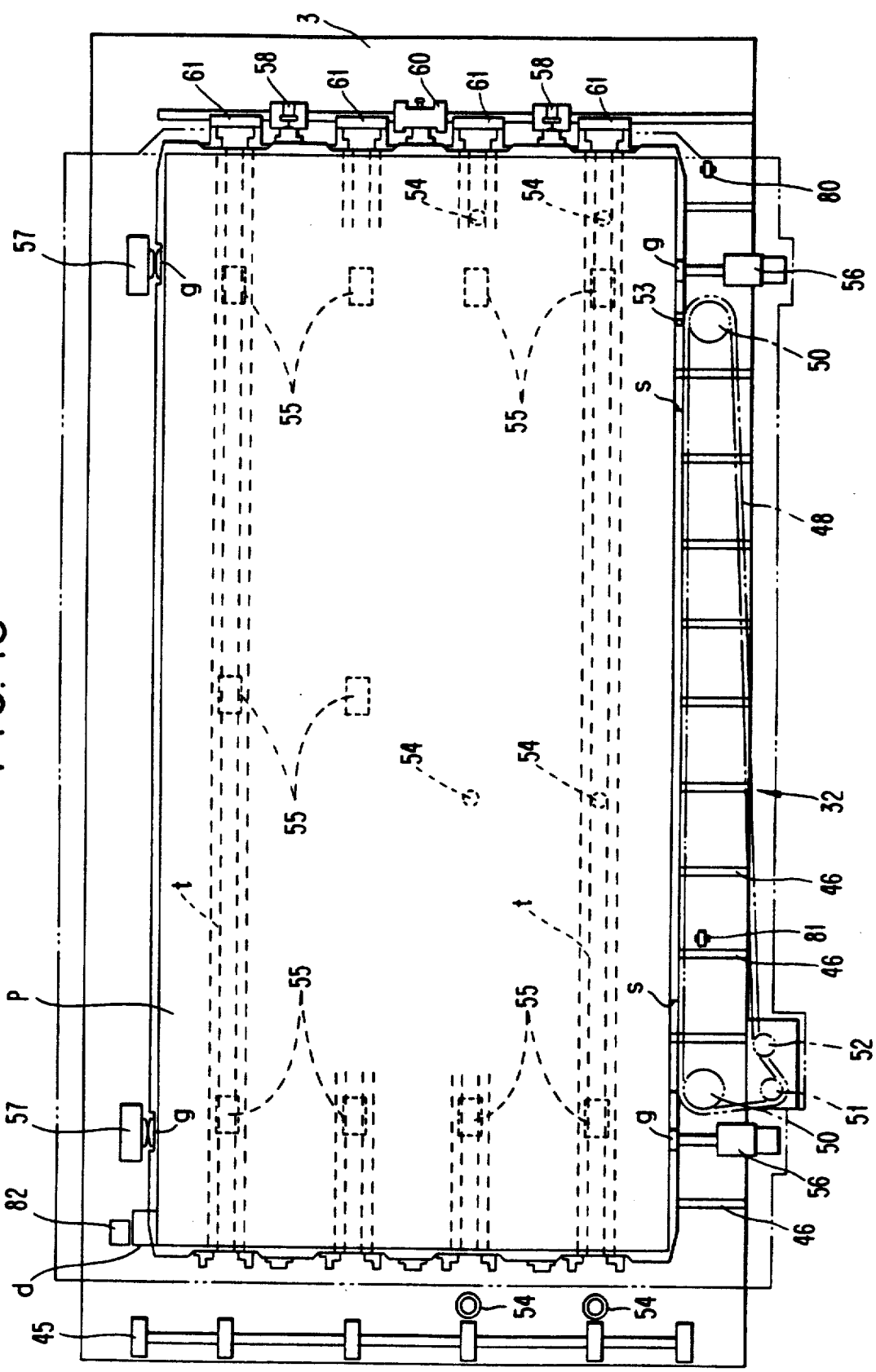
FIG. 13 is a plan view of the table of a machine tool with the pallet placed thereon.

As shown in FIG. 13, the table 3 has a row of intermediate rollers 45 on the end thereof (shown on the lefthand side) closer to the pallet carriage 6 for rollingly receiving the lower surface of the leading end of the pallet P which is coming from the pallet carriage 6.

The table 3 also has a plurality of T-shaped slots 46 defined in its upper surface and extending perpendicularly to the direction (horizontal direction in FIG. 13) in which the pallet P is transferred. Vertically movable support rollers 47 (see FIGS. 14(A) and 14(B)) are disposed in the T-shaped slots 46. The transfer mechanism 32 is disposed on one longitudinal side of the table 3.

The transfer mechanism 32 comprises an endless roller chain 48 lying in a horizontal plane, a pair of sprockets 50 around which the roller chain 48 is trained, a hydraulic motor 51, and a tensioner 52 for tensioning the roller chain 48. The roller chain 48 has, on its inner straight run along the pallet P, top rollers 53 which engage in the side grooves s of the pallet P. With the top rollers 53 received in the side grooves s, the roller chain 48 is actuated by the hydraulic motor 51 to transfer the pallet P onto and from the table 3.

Since the roller chain 48 travels in a horizontal path, any machining which may be necessary to adapt existing machine tools to the apparatus of the present invention is minimized.

The table 3 has two rows of guide rollers 54 on its opposite ends and center for preventing the pallet P from being wobbled laterally when the pallet P is loaded onto and unloaded from the table 3. More specifically, the guide rollers 54, which comprise horizontal rollers rotatable about vertical axes, enter two of the four T-shaped grooves t in the lower surface of the pallet P as it moves onto the table 3. Each of the two rows is composed of three guide rollers 54.

When the pallet P is transferred onto the table 3, a plurality of clamp units 55 shown by the broken lines in FIG. 13, enter the T-shaped slots t of the pallet P. The clamp units 55 will be described below in relation to a positioning clamp mechanism on the table 3.

The table 3 has two side-push cylinder units 56 disposed near the transfer mechanism 32 on one side thereof. The side-push cylinder units 56 serve to push a lateral side of the pallet P which has been transferred onto the table 3 to hold and position the pallet P against side stoppers 57 on the other side of the table 3. When the pallet P is held against the side stoppers 57 by the side-push cylinder units 56, the pallet P is accurately positioned transversely in the horizontal direction while eliminating clearances between the guide rollers 54, the clamp units 55 and inner side surfaces of the T-shaped slots t of the pallet P.

Quenched metal plates g of increased mechanical strength are embedded in the sides of pallet P for engagement with the rods of the side-push cylinder units 56 and the side stoppers 57.

The table 3 also has, on its end remote from the intermediate rollers 45, shock absorbers 58, a stopper 60, and air inlet manifolds 61 for applying air jets from the lower surface of the pallet P to the table 3. The shock absorbers 58, the stopper 60, and the air inlet manifolds 61 will be described later on.

Figure 14A:
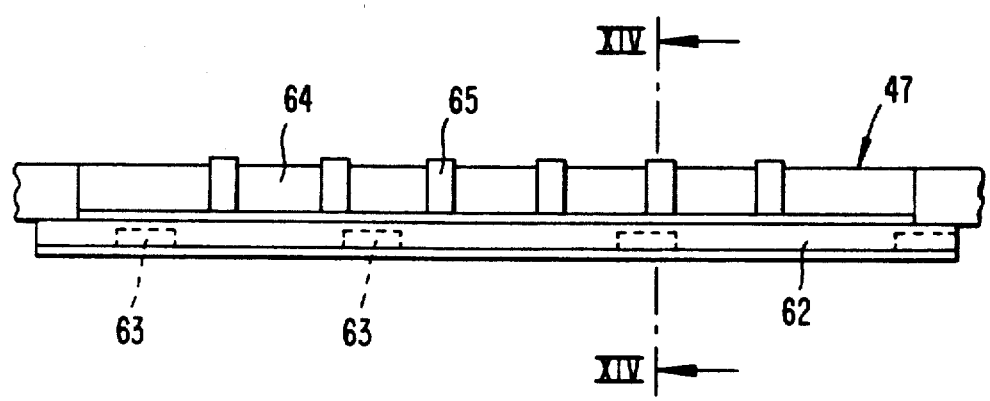
FIG. 14(A) is a fragmentary view of a vertically movable support roller.
Figure 14B:
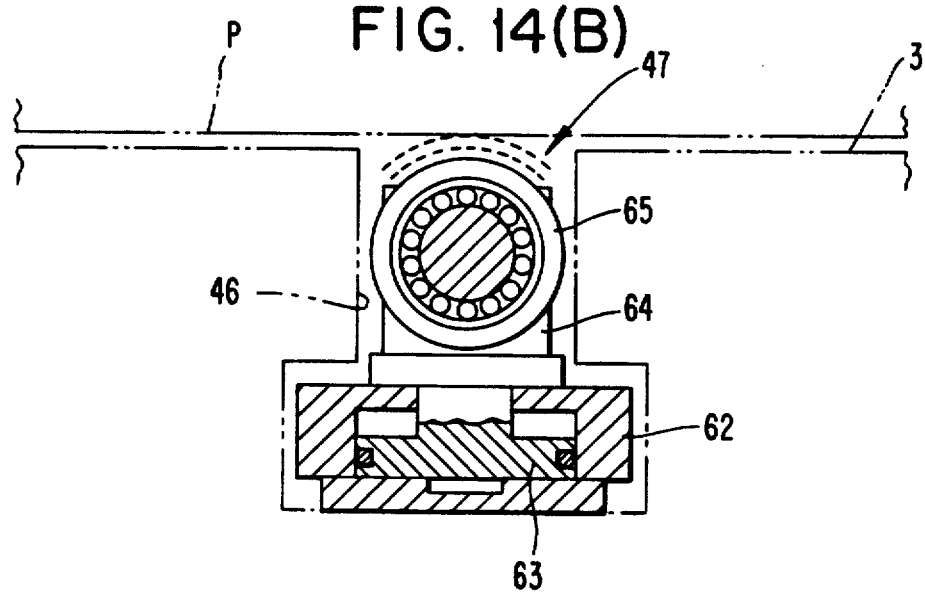
FIG. 14(B) is an enlarged cross-sectional view taken along line XIV—XIV of FIG. 14(A)

The vertically movable support rollers 47 disposed in the T-shaped slots 46 will be described below with reference to FIGS. 14(A) and 14(B).

Each of the vertically movable support rollers 47, which is disposed in one of the T-shaped slots 46, comprises an elongate cylinder case 62 positioned in the T-shaped slot 46, a plurality of pistons 63 disposed at suitable intervals or pitches in the cylinder case 62, a roller support 64 joined to the upper ends of the pistons 63, and a plurality of rollers 65 rotatably supported on the roller support 64.

When the pistons 63 are elevated under a pressure buildup in the cylinder case 62, the upper ends of the rollers 65 project upwardly slightly beyond the upper surface of the table 3. When the pistons 63 are lowered by a pressure reduction in the cylinder case 62, the upper ends of the rollers 65 are retracted downwardly beyond the upper surface of the table 3. The rollers 65 are projected upwardly upon transferring the pallet P onto and from the table 3, and retracted downwardly upon positioning the pallet P on the table 3.

As described above, the clamp units 55 are placed in the T-shaped slots t of the pallet P when the pallet P are transferred onto the table 3. As shown in FIG. 13, three clamp units 55, for example, are provided for entry into each of the T-shaped slots t.

Figure 17:
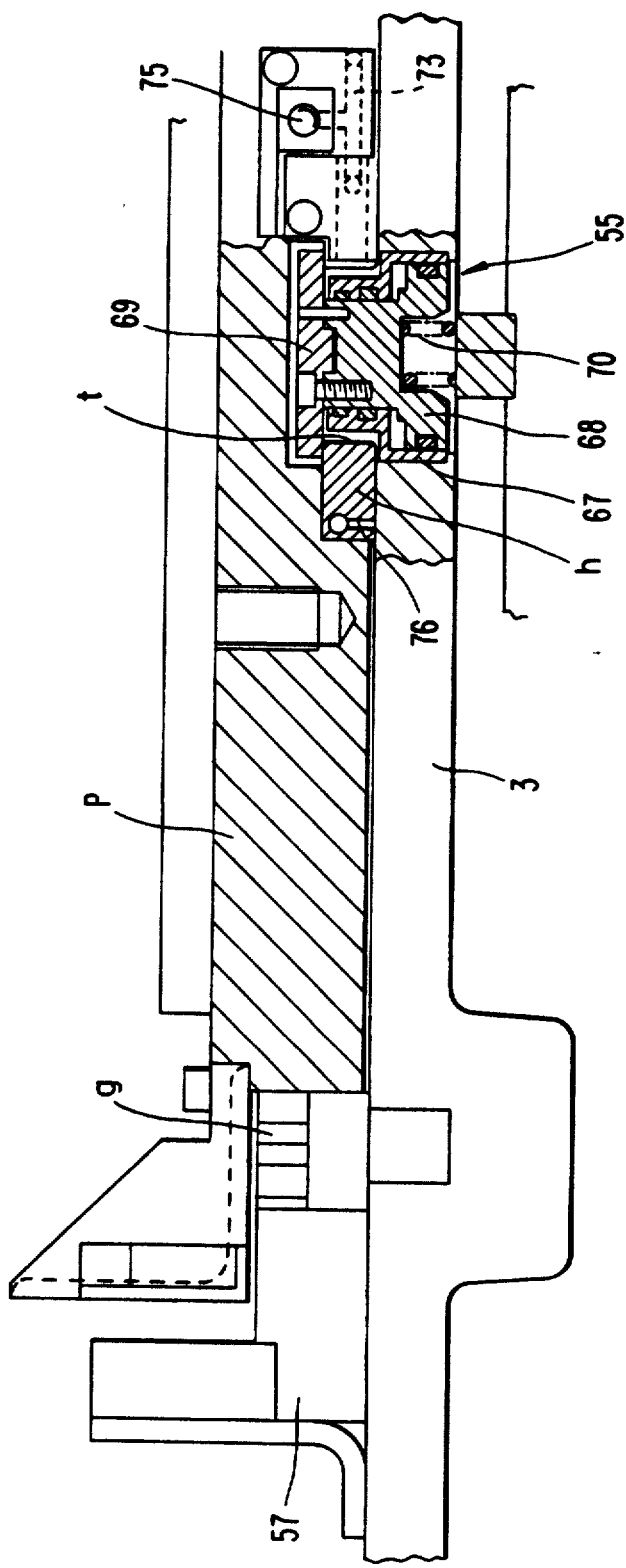
FIG. 17 is a cross-sectional view taken along line XVII—XVII of FIG. 15.

As shown in FIG. 17, each of the clamp units 55 comprises a cylinder 67 fixedly mounted in the table 3, a clamping piston 68 movably fitted in the cylinder 67, and a rectangular clamp plate 69 fixed to the upper end of the clamping piston 68. The cylinder 67 has a portion projecting upwardly of the table 3 and having a diameter smaller than the width of a lower narrower portion of the T-shaped slot t of the pallet P such that the upwardly projecting portion of the cylinder 67 can enter the T-shaped slot t. The clamp plate 69 has a width greater than the width of the lower narrower portion of the T-shaped slot t, and is placed within an upper wider portion of the T-shaped slot t.

An unclamping spring 70 is disposed below the clamping piston 68 and acts thereon for normally urging the clamping piston 68 upwardly. When the clamping piston 68 is shifted upwardly under the bias of the unclamping spring 70, the clamp plate 68 can enter the upper wider portion of the T-shaped slot t with clearances therebetween. When the clamping piston 68 is lowered under a pressure buildup in the cylinder 67, the clamp plate 69 is pressed against the shoulders between the upper wider and lower narrower portions of the T-shaped slot t, thus clamping the pallet P against the upper surface of the table 3.

The shoulders of the T-shaped slot t, which are pressed against the table 3 by the clamp plate 69, comprise quenched plates h of increased mechanical strength which have lower surfaces projecting downwardly slightly beyond the lower surface of the pallet P. When the pallet P is clamped by the clamp units 55, therefore, the lower surfaces of the quenched plates h are held in close contact with the table 3.

The air inlet manifolds 61 will be described below.

The air inlet manifolds 61 serve to apply air jets from air passages in the pallet P to the upper surface of the table 3 when the pallet P is introduced onto the table 3 while being supported on the support rollers 47 to remove dust or dirt off the table 3. The air inlet manifolds 61 are automatically actuated when the pallet P is transferred onto the table 3.

Figure 15:
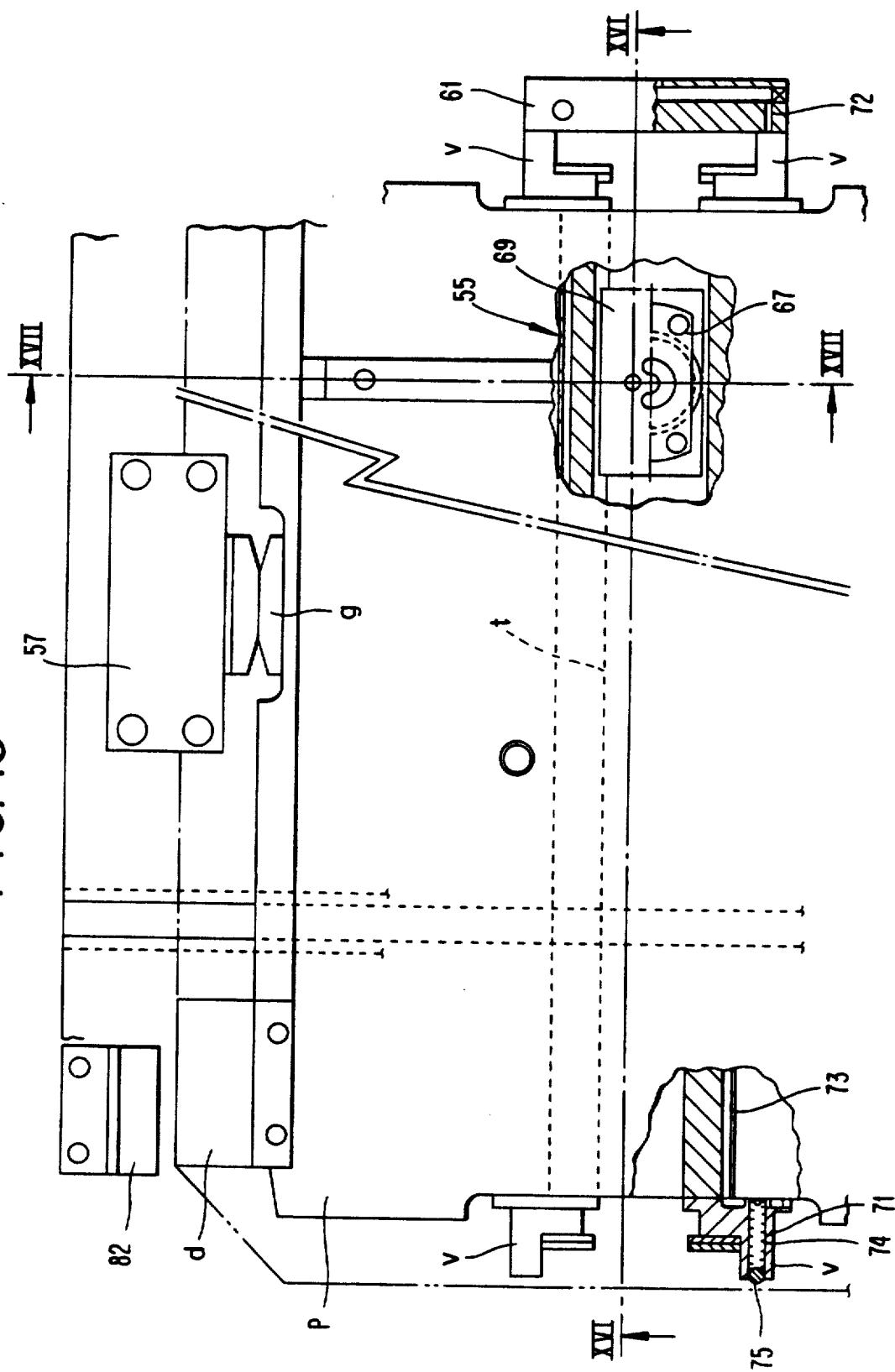
FIG. 15 is an enlarged fragmentary view of the table shown in FIG. 13.
Figure 16:
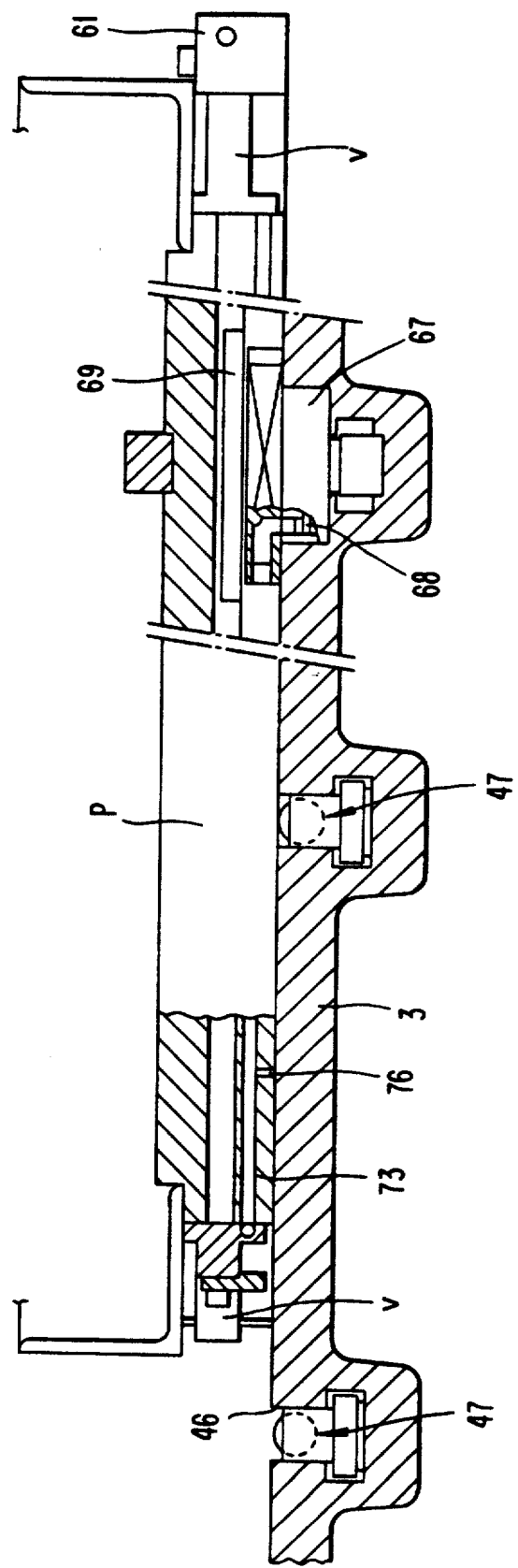
FIG. 16 is a cross-sectional view taken along line XVII—XVI of FIG. 15.

As shown in FIG. 13, there are four air inlet manifolds 61 at the end of the table 3 remote from the intermediate rollers 45. The air inlet manifolds 61 are connected to an air pressure source such as an air compressor (not shown). As shown in FIGS. 15 through 17, the pallet P has protrusions v on its opposite ends, and the protrusions v have respective air holes 71 defined therein. Air supplied from air passages 72 defined in the air inlet manifolds 61 is introduced through the air holes 71 into air passages 73 defined in the pallet P.

As shown on the lefthand side in FIG. 15, a ball 75 is positioned in the air hole 71 and normally urged by a spring 74 in the air hole 71 so as to slightly project from the opening of the air hole 71, thereby closing the air hole 71. When the end of the protrusion v abuts against the air inlet manifold 61, the ball 75 is pushed back into the air hole 71, allowing air to be introduced from the air inlet manifold 61 into the pallet P. The pallet P also has a number of airblow holes 76 defined therein in communication with the air passage 73 and opening downwardly.

In the illustrated embodiment, the airblow holes 76 are defined in the quenched plates h in the T-shaped slots t, so that air jets ejected from the airblow holes 76 can clean those regions of the table 3 which are directly contacted by the quenched plates h when the pallet P is clamped against the table 3.

Figure 18A:
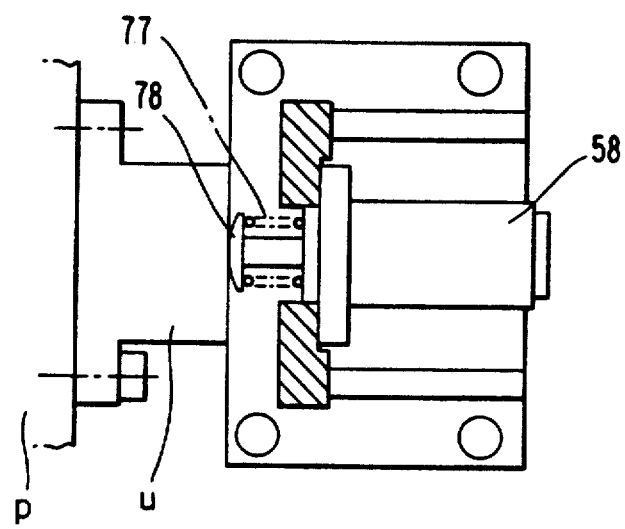
FIG. 18(A) is a plan view of a shock absorber.
Figure 18B:
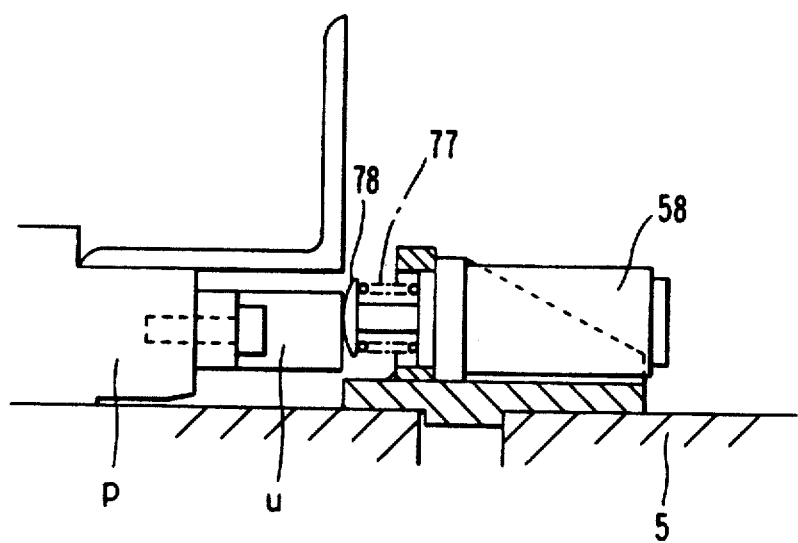
FIG. 18(B) is a side elevational view of the shock absorber.

The shock absorbers 58 are positioned adjacent to the air inlet manifolds 61, respectively. As shown in FIGS. 18(A) and 18(B), each of the shock absorbers 58 has an abutment 78 normally urged to project toward the pallet P on the table 3. When the pallet P is transferred onto the table 3, the abutment 78 bears against a corresponding abutment block u on the leading end of the pallet P.

As shown in FIG. 13, the table 3 also has, near the transfer mechanism 32, a limit switch 80 for confirming a forward position of the pallet P on the table 3, and a limit switch 81 for confirming a withdrawal of the pallet P from the table 3. The table 3 further includes a data reader 82 positioned on the lefthand end (FIG. 13) on its side opposite to the transfer mechanism 32 for reading data from a data carrier d that is attached to a corresponding side of the pallet P.

Operation of the apparatus for transferring and positioning a pallet P will be described below.

A workpiece W is placed and fixedly positioned on a pallet P by the leftmost pallet stocker 1 (FIG. 1). Thereafter, the pallet P is transferred onto a pallet carriage 6 in front of the pallet stocker 1 by the transfer mechanisms 30, 31. At this time, the central axis of the pallet carriage 6 is aligned with the central axis of the pallet stocker 1. Specifically, the top rollers of the transfer mechanism 30 engage in the grooves m in the lower surface of the pallet P, and the transfer mechanism 30 pushes the pallet P by half of the predetermined stroke from the pallet stocker 1 toward the pallet carriage 6. The top rollers 38 (see FIG. 4) of the transfer mechanism 31 engages in the same grooves m of the pallet P, and the transfer mechanism 31 pulls the pallet P by the remaining half of the stroke onto the pallet carriage 6. Thereafter, the pallet stoppers 41 on the side of the pallet carriage 6 over which the pallet P has been transferred are lifted to position the pallet P on the pallet carriage 6.

The pallet carriage 6 is thereafter controlled to travel along the guide rails 5 by a command signal which may be supplied from a controller such as a CPU to the motor 8. The pallet carriage 6 moves into a position in front of one of the machine tools 2, wherein the central axis of the pallet carriage 6 is aligned with the central axis of the machine tool 2.

At this time, the height of the table 3 is slightly greater than the height of the pallet P on the pallet carriage 6. In order to transfer the pallet P onto the table 3, it is necessary td raise the pallet P with respect to the table 3. The lifting mechanisms 10 on the pallet carriage 6 are actuated to lift the pallet carriage 6 until the lower surface of the pallet P is horizontally aligned with the upper ends of the support rollers 47 which project upwardly slightly beyond the upper surface of the table 3.

More specifically, the motor 13 shown in FIG. 3 is energized to extend the four lifters 12 downwardly from the position shown in FIG. 9(A). First, the cylindrical member 18 of the lifting mechanism 10 shown in FIG. 6 engages the pin 21b of the lower positioning member 21 for roughly positioning the pallet carriage 6. Since the tapered surfaces 18a of the cylindrical member 18 engage the guide taper surfaces c of the pins 21b for laterally positioning the cylindrical member 18 with respect to the pin 21b, the cylindrical member 18 can engage the pin 21b smoothly even if they are slightly displaced in position one from the other.

The lifting mechanism 10 of the configuration shown in FIG. 6 is positioned on the lower left corner shown in FIG. 3 where the wheel 9b has no flange and the pallet carriage 6 is more liable to get positionally displaced. Therefore, the lifting mechanism 10 shown in FIG. 6 is more effective to position the pallet carriage 6 initially than would be if it were located on the right corners of the pallet carriage 6.

Upon further downward movement of the lifters 12, the cylindrical members 18 fit over the corresponding pins 21a, and push the dust caps 27 downwardly. When the dust caps 27 are prevented from being further lowered by the position adjusting spacers 25, the pallet carriage 6 is lifted off the guide rails 5 as shown in FIG. 9(B). After the lifters 12 have been extended a predetermined stroke until the upper surfaces of the rollers 34 of the pallet carriage 6 are horizontally aligned with the upper surfaces of the support rollers 47 of the table 3, the motor 13 is de-energized.

To vary the height of the pallet carriage 6, the position adjusting spacers 25 fitted around the pins 21b may be replaced with other position adjusting spacers having a different axial length. Because position adjusting spacers 25 of different axial lengths may selectively be used, the stroke that the lifters 12 of the pallet carriage 6 are extended may be held constant.

After the pallet carriage 6 are horizontally and vertically positioned in this manner, the pallet P is transferred from the pallet carriage 6 onto the table 3. First, the roller chain 35 of the transfer mechanism 31 on the pallet carriage 6 is actuated to cause the top rollers 38 to engage in the grooves m of the pallet P and drag the pallet P toward the pallet 3, as shown in FIGS. 19(A), 19(B), and 19(C).

When the leading end of the pallet P reaches the table 3, the side grooves s of the side of the pallet P are successively engaged by the top rollers 53 of the transfer mechanism 32. The roller chain 48 of the transfer mechanism 32 is now actuated to pull the pallet P onto the table 3, as shown in FIGS. 19(D) and 19(E).

The pallet P is also shown in fragmentary plan on the righthand side of FIGS. 19(D) and 19(E).

As described above, the pallet 9 is transferred half of the stroke by the transfer mechanism 31, and then transferred by the remaining half of the stroke by the transfer mechanism 32. At this time, the support rollers 47 are in their elevated position, supporting the lower surface of the pallet P.

While the pallet P is being thus transferred, the guide rollers 40 on the pallet carriage 6 enter the two central T-shaped slots t of the pallet P to guide the pallet P (see FIG. 5), and the guide rollers 54 on the table 3 enter the two side T-shaped slots t of the pallet P to guide the pallet P (see FIG. 13). Consequently, the pallet P is prevented from being wobbled transversely.

Simultaneously, the clamp units 55 on the table 3 enter, with clearances, the T-shaped slots t of the pallet P.

When the pallet P reaches the position shown in FIG. 19(E), the leading end of the pallet P abuts against the stopper 60 on the table 3, and the pallet P is positioned in the longitudinal direction thereof as shown in FIG. 13. The protrusions v shown in FIGS. 15 through 17 are engaged by the air inlet manifolds 61, whereupon air is automatically supported into the air passage 73 in the pallet P. Air jets are applied from the airblow holes 76 downwardly against the table 3, thereby forcing dust or dirt off the table 3.

At the same time, the side-push cylinder units 56 shown in FIG. 13 are actuated to push the pallet P toward the side stoppers 57 on the other side of the table 3. The pallet P is now reliably positioned transversely horizontally on the table 3.

Thereafter, the support rollers 47 are slowly lowered to allow the lower surface of the pallet P to contact the table 3, whereupon the clamp units 55 are actuated. That is, the clamping pistons 68 are lowered to enable the clamp plates 69 to press and clamp the pallet P on the table 3, as shown in FIG. 17.

Inasmuch as the pallet P is clamped directly on the table 3, the workpiece W on the pallet P is held in a low position, and the cutting tool above the workpiece W is allowed to operate freely in a wide space. The pallet P is vertically positioned highly accurately because those regions of the table 3 which are contacted by the quenched plates h are intensively cleaned by air jets ejected from the airblow holes 76.

While the pallet P and hence the workpiece W are being positioned, the workpiece W is machined by the machine tool 2. After the workpiece W is machined, the pallet P is unloaded from the table 3 in a process which is a reversal of the above transferring or loading process. Specifically, the pallet P is unclamped by the clamp units 55, and is transferred half of its stroke by the transfer mechanism 32 and then pulled the remaining half of the stroke by the transfer mechanism 31, as shown in FIGS. 20(A) through 20(E).

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. An apparatus for transferring and positioning a pallet for placing a workpiece thereon on a table of a machine tool, comprising:

a pallet carriage for carrying a pallet, said pallet carriage having a lifting mechanism for vertically moving the pallet carriage, and a first transfer mechanism for transferring the pallet substantially half of a predetermined stroke toward a machine tool;

a machine tool table having a second transfer mechanism for transferring substantially the remaining half of the predetermined stroke, and a positioning clamp mechanism for positioning and clamping the pallet on the table directly in close contact therewith.

2. An apparatus according to claim 1, wherein said lifting mechanism comprises a plurality of lifters mounted on said pallet carriage and having respective cylindrical members on lower ends thereof, actuator means for vertically moving said lifters, and a plurality of positioning members fixedly disposed for coaction with said cylindrical members, respectively, each of said positioning members comprising a pin for fitting engagement with one of said cylindrical members, and a support for supporting a lower surface of said one of the cylindrical members.

3. An apparatus according to claim 2, wherein one of said pins has a height greater than the heights of the other pins, and has a guide taper on an upper end thereof.

4. An apparatus according to claim 2, wherein said lifting mechanism further includes a plurality of spacers detachably mounted on the supports, respectively, for adjusting a distance by which the pallet carriage can be vertically moved by said lifting mechanism.

5. An apparatus according to claim 1, wherein said first and second transfer mechanisms have respective differently positioned members for engaging the pallet.

6. An apparatus according to claim 1, wherein said second transfer mechanism comprises a pair of horizontal sprockets rotatably mounted on one side of said table, an endless roller chain trained around said horizontal sprockets, and a motor for actuating said endless roller chain, said roller chain having a straight run extending in a longitudinal direction of the pallet.

7. An apparatus according to claim 1, wherein said second transfer mechanism comprises a plurality of support rollers vertically movable into and out of said table, and positioning means for horizontally positioning said pallet.

8. An apparatus according to claim 1, wherein said positioning clamp mechanism comprises a plurality of rows of cylinder units disposed in said table and spaced at predetermined distances, and a plurality of clamping members of T-shaped cross section which are vertically movable by said cylinder units, respectively, said clamping members having respective upper ends disposed over said table such that the upper ends of the clamping members can be inserted into T-shaped slots defined in a lower surface of the pallet as it is transferred onto said table when said clamping members are vertically moved upwardly.

9. An apparatus according to claim 8, wherein said pallet has a plurality of plates defining partly said T-shaped slots and having lower surfaces projecting downwardly beyond the lower surface of the pallet for directly contacting said table when said clamping members are vertically moved downwardly.

10. An apparatus according to claim 1, wherein said pallet has a thickness small enough to cause the lower surface thereof to be brought into intimate contact with said table by the weight of a workpiece placed on said pallet.

* * * * *